Oct. 23, 1962   J. W. PAULSON   3,060,256
LOW TEMPERATURE DRY CELL
Filed March 7, 1960

INVENTOR.
BY JOHN W. PAULSON
Rolf N. Olsen
ATTORNEY

United States Patent Office 3,060,256
Patented Oct. 23, 1962

3,060,256
LOW TEMPERATURE DRY CELL
John W. Pauison, Madison, Wis., assignor to The Electric Storage Battery Company, Philadelphia, Pa., a corporation of New Jersey
Filed Mar. 7, 1960, Ser. No. 12,989
4 Claims. (Cl. 136—103)

This invention relates to dry cells and more particularly to dry cells having depolarizer mixes specially adapted for low temperature operation.

In recent years there have been demands for increased dry cell capacity at low temperatures. This has been due primarily to the requirement for operation of military communications equipment under Arctic weather conditions. As a result, dry cell performance at temperatures as low as minus 40 degrees C. has become important. The capacity of ordinary Leclanche dry cells is drastically reduced under the extremely low temperatures encountered in such service, and numerous attempts have been made to improve their low temperature performance. These efforts have been concerned mainly with the use of special electrolyte formulations which are designed for improved conductivity and ionic mobility at the low temperatures involved. An example of such special Leclanche low temperature electrolyte formulation is disclosed in Wilke Patent No. 2,403,571 in which lithium chloride is added to the usual Leclanche aqueous zinc chloride-ammonium chloride electrolyte solution. Despite such efforts, however, there is still a pressing need for improving the service life and capacity of dry cells at low temperatures.

It is accordingly an object of this invention to provide a dry cell which has improved performance at low temperatures.

It is a further object of this invention to provide a depolarizer mix body having an extremely thin cross section and adapted for use in dry cells intended for low temperature service.

A still further object is to provide dry cell depolarizer mix formulations which have increased capacity in low temperature discharge.

These and other objects and advantages are obtained by the present invention which utilizes a high ratio of manganese dioxide to conductive material in the depolarizer mix body in Leclanche dry cells designed for low temperature operation.

It is normal practice in dry cell manufacture to mix conductive material such as carbon black, acetylene black or graphite with manganese dioxide in order to increase the conductivity of the depolarizer mix. In cylindrical cells employing a zinc can anode and a centrally located carbon rod surrounded by a body of depolarizer mix, the optimum ratio of manganese dioxide to conductive material is about 7 to 1. At higher ratios of manganese dioxide to conductive material, the internal cell resistance is increased with a resulting decrease in cell capacity. At lower ratios of manganese dioxide to conductive material cell capacity decreases as the lower depolarizing capacity of the mix becomes the limiting factor in cell performance.

I have now discovered that capacities at low temperature are greatly increased by using depolarizer mix bodies having thin cross sections and having a ratio of manganese dioxide to conductive material of from about 8 to about 20 parts manganese dioxide to 1 part conductive material.

Figure 1:
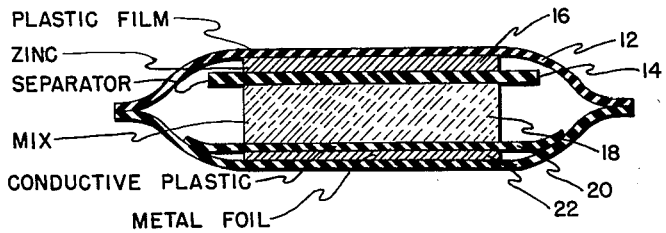
FIG. 1 is a sectional elevational view of a flat type cell according to the invention.

FIG. 1 shows a flat type battery comprising an outer plastic envelope 12 enclosing the active cell components. Separator 14 is interposed between zinc anode 16 and depolarizer mix cake 18. The edges of conductive plastic current collector 20 are sealed to the outer plastic envelope 12 to form a pocket enclosing metal foil conductor 22. The thickness of the parts of the cell is greatly exaggerated in the drawing. In practice I have found low temperature performance in cells according to the present invention is greatly improved by using extremely thin cell parts; for example, cells made with zinc anodes of from 1 to 6 mils thick and mix cakes of from 7 to 250 mils thick have shown particularly good results.

According to the present invention, the depolarizer mix is formed from a mixture of manganese dioxide and conductive material in the ratio of from about 8 to about 20 parts manganese dioxide to 1 part conductive material. The conductive material may be special battery grade carbon black, graphite or other suitable conductive material. The mix cake may be formed by tamping the mix wet with electrolyte in a mold to form a flat coherent cake. Mix cakes from 7 mils to 120 mils in thickness made in accordance with the present invention have been found to be especially suitable for improved low temperature performance.

Mix cakes may be formed by coating the electrolyte-wetted depolarizer mix onto a carrier of cheesecloth, woven glass cloth or similar open mesh mat. Where extremely thin mix cakes are used, coating the mix cake onto a mat is particularly helpful in avoiding crumbling of the mix cake during cell assembly.

The formation of the mix cake in situ may also be accomplished when using a very wet mix. I have found that low temperature performance is improved when high moisture content is maintained in the mix body. Mix cakes having moisture content as high as 36% may be formed by placing a stencil of the proper size and thickness at the point where the mix cake is to be located. The wet depolarizer mixture is then placed in the opening in the stencil and leveled off to form a mix cake by the removal of the stencil. This method is particularly suitable in forming thin mix cakes from very wet mixes.

In the design of batteries for service at low temperatures, the thickness and area of mix cakes may be varied, consistent with battery size limitations, depending upon the capacity desired. It will be understood by those skilled in the art that anode area and thickness and mix cake area and thickness for a balanced cell will be determined by the capacity requirements. The optimum combination of depolarizer thickness and area for any particular discharge conditions can thus be readily determined.

Table I presents a comparison of the performance of BA2270/U batteries constructed of flat cells using thin mix cakes with a 20 to 1 ratio of manganese dioxide to carbon black and the same battery constructed of cylindrical cells using a mix ratio of 7 parts manganese dioxide to 1 part carbon black.

Table I

| | Flat Cell Design 20:1 MnO₂-C—Battery Section | | | Cylindrical Cell Design 7:1 MnO₂-C—Battery Section | | |
|---|---|---|---|---|---|---|
| | A | B₁ | B₂ | A (A-Size) | B₁ (N-Size) | B₂ (N-Size) |
| Depolarizer Layer thickness, in | .120 | .071 | .023 | .212 | .140 | .140 |
| Geometric Electrode Area, in.² | 77.0 | 3.5 | 3.5 | 58.0 | 2.18 | 1.09 |
| Total MnO₂, weight g | 293 | 244 | 67 | 126 | 98 | 49 |
| Initial Capacity at −40 degrees C., hr | 8 | 9 | 9 | 2 | 2 | 2 |
| Hours/100 g. MnO₂ | 2.73 | 3.69 | 13.45 | 1.59 | 2.04 | 4.08 |

Consideration of the data of Table I shows that the use of thin mix cakes with the high ratio of manganese dioxide to carbon black gives approximately a four fold increase in capacity as compared to the cylindrical cell. In addition, the efficiency of utilization of the manganese dioxide is considerably better in the battery using a thin mix cake with high ratio of manganese dioxide to carbon black.

Figure 2:
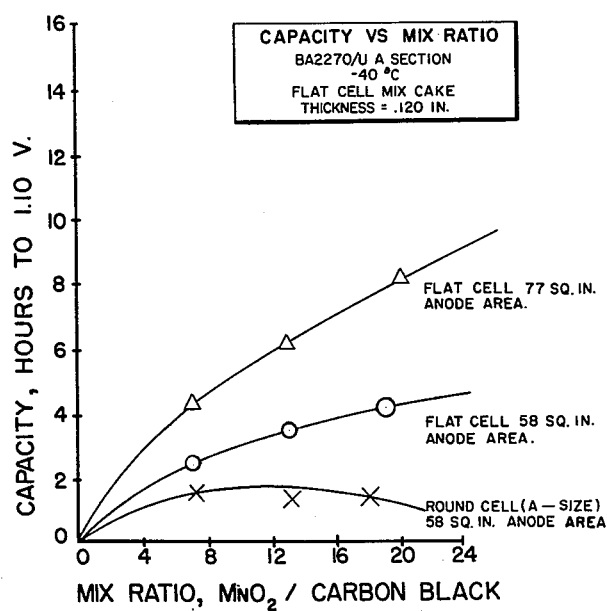
FIG. 2 is a plot of capacity vs. manganese dioxide-carbon black ratio for flat and round cells.

The effect of increasing the ratio of manganese to carbon black in flat cells and in cylindrical cells is shown in FIG. 2. In the cylindrical cell, when discharged at minus 40 degrees C., capacity increases as the ratio of manganese dioxide to carbon black is increased to approximately 7 to 1. Ratios of manganese dioxide to carbon black higher than about 7 to 1 do not increase the capacity of cylindrical cells. In flat cells having thin mix cakes the capacity is shown to increase substantially with increasing ratio of manganese dioxide to carbon black.

The increase in capacity with increasing ratios of manganese dioxide to carbon black is less at mix ratio above 20 to 1. There is no particular advantage capacity-wise with mix ratio of 30 to 1 over the preferred 20 to 1 mix ratio. I, therefore, prefer to use a mix ratio of about 20 parts manganese dioxide to 1 part carbon black.

The exact mechanism involved in obtaining the increased capacity at low temperatures with cells employing thin mix cakes with high ratios of manganese dioxide to conductive material is not known. The more favorable geometery in the flat cell construction apparently permits equal current densities throughout the thickness of the mix cake and smaller amounts of the conductive material are required to provide conductivity in the thin mix cake. In the cylindrical cell, the current density increases from the outer surface of the depolarizer core to the carbon rod in the center of the core. Under these conditions, apparently a greater proportion of conductive material is required in the mix to provide a satisfatcory electronically-conductive path through the mix core. However, regardless of any theory of operation, my tests have shown that the low temperature capacity of dry cells is materially increased by the use of thin mix cakes with high ratios of manganese dioxide to conductive material.

I claim:

1. In a low temperature primary galvanic cell of the zinc-carbon-manganese dioxide system having an aqueous zinc chloride-ammonium chloride-lithium chloride electrolyte solution, the improvement which comprises a depolarizer mix body from 7 to 250 mils thick and having a mixture of manganese dioxide and carbon black in the ratio of at least 20 parts by weight of manganese dioxide to 1 part by weight of carbon black.

2. In a low temperature primary galvanic cell of the zinc-carbonmangnese dioxide system having an aqueous zinc chloride-ammonium chloride-lithium chloride electrolyte solution and containing a thin flat anode, a separator and a conductive plastic current collector, the improvement which comprises a depolarizer mix body interposed between said separator and said current collector, said mix body having a thickness of from about 7 to about 250 mils and comprising a mixture of manganese dioxide and carbon black in the ratio of 20 parts by weight of manganese dioxied to 1 part by weight of carbon black.

3. In a low temperature primary galvanic cell comprising a zinc anode, a separator, a conductive plastic current collector, an aqueous zinc chloride-ammonium chloride-lithium chloride solution and a depolarizer mix cake, the improvement which comprises a depolarizer mix cake of from 7 to 250 mils in thickness, said depolarizer mix being wetted with the said electrolyte solution and comprising a mixture of manganese dioxide and conductive material in the ratio of from about 8 to about 20 parts by weight of manganese dioxide to 1 part by weight of conductive material.

4. In a low temperature primary galvanic cell comprising a zinc anode of from 1 mil to 6 mils in thickness, a separator contacting said zinc anode, a conductive plastic current collector, an aqueous zinc chloride-ammonium chloride-lithium chloride electrolyte solution and a depolarizer mix cake interposed between said separator and said current collector, the improvement which comprises a depolarizer mix cake having a thickness of from about 1 mil to about 120 mils, a ratio of manganese dioxide to carbon black of from about 8 to about 20 parts by weight and wetted with said electrolyte solution to a moisture content of about 36%.

References Cited in the file of this patent

UNITED STATES PATENTS

| | | |
|---|---|---|
| 1,296,700 | Ruhoff | Mar. 11, 1919 |
| 1,391,211 | Ruhoff | Sept. 20, 1921 |
| 2,591,532 | Fox | Apr. 1, 1952 |
| 2,650,945 | Herbert | Sept. 1, 1953 |
| 2,783,292 | Ruben | Feb. 26, 1957 |
| 2,844,641 | Lang et al. | July 22, 1958 |
| 2,903,498 | Sindel et al. | Sept. 8, 1959 |